US006840852B2

(12) United States Patent
Gehring et al.

(10) Patent No.: US 6,840,852 B2
(45) Date of Patent: Jan. 11, 2005

(54) AIR DUCT OUTLETS WITH MANUAL AND AUTOMATIC AIR STREAM DIRECTION CONTROL

(75) Inventors: Thomas F. J. Gehring, Ontario (CA); Ireneusz Jankowski, Ontario (CA); Dejan Havidic, Toronto (CA); Douglas Lim Hester, Scarborough (CA); Peter Dominic Lewis, Etobicoke (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/661,975

(22) Filed: Sep. 11, 2003

(65) Prior Publication Data

US 2004/0152412 A1 Aug. 5, 2004

Related U.S. Application Data

(60) Provisional application No. 60/444,335, filed on Jan. 31, 2003.

(51) Int. Cl.[7] .................................................. B60H 1/34
(52) U.S. Cl. ........................................ 454/153; 454/285
(58) Field of Search .............................. 454/153, 202, 454/285

(56) References Cited

U.S. PATENT DOCUMENTS

| 1,428,882 A | 9/1922 | Dyer |
| 2,135,810 A | 11/1938 | Germonprez |
| 2,395,319 A | 2/1946 | Davies |
| 2,759,410 A | 8/1956 | Hurt, Jr. |
| 2,987,981 A | 6/1961 | Boylan |
| 3,456,574 A | 7/1969 | Jakeway |
| 3,552,295 A | 1/1971 | Armstrong |
| 3,701,311 A | 10/1972 | McLarty |
| 3,952,639 A | 4/1976 | Nobata |
| 4,006,673 A | 2/1977 | Meyer et al. |
| 4,060,024 A | 11/1977 | Deck |
| 4,345,510 A | 8/1982 | Sterett |
| 4,621,570 A | 11/1986 | Bolton et al. |
| 4,646,625 A | 3/1987 | Schroeder |
| 4,676,146 A | * 6/1987 | Takahashi et al. .......... 454/256 |
| 4,702,156 A | 10/1987 | Sano |
| 4,928,582 A | 5/1990 | Elfverson |
| 4,938,122 A | 7/1990 | Ziemba |
| 5,036,753 A | 8/1991 | Ostrand et al. |
| 5,072,657 A | * 12/1991 | Sakai .......................... 454/153 |
| 5,230,655 A | 7/1993 | Thompson et al. ......... 454/202 |
| 5,338,252 A | 8/1994 | Bowler et al. .............. 454/155 |
| 5,480,350 A | 1/1996 | Naruse ........................ 454/155 |
| 5,569,076 A | 10/1996 | Sudak et al. ................ 454/155 |
| 5,690,550 A | 11/1997 | Mikowski .................... 454/155 |
| 5,741,179 A | 4/1998 | Sun et al. .................... 454/155 |
| 5,746,651 A | 5/1998 | Arajs et al. ................. 454/154 |
| 5,752,877 A | 5/1998 | Sun .............................. 454/155 |
| 5,947,813 A | 9/1999 | Chow et al. ................ 454/155 |
| 6,059,653 A | 5/2000 | Gehring et al. ............. 454/155 |

(List continued on next page.)

Primary Examiner—Harold Joyce
(74) Attorney, Agent, or Firm—Myers Bigel Sibley & Sajovec, P.A.

(57) ABSTRACT

Air duct outlets provide automatic oscillation of air flow and also allow users to manually redirect air streams. An air duct outlet includes a housing having an air passageway that terminates at an air outlet. A drive source is operably connected to a reciprocating member and transmits reciprocating motion to the reciprocating member. An air-directing vane is pivotally attached within the air passageway and is movable within a range of positions to direct an air stream flowing through the air passageway and exiting from the outlet. An actuator extends from the housing and is movable between first, second and third positions. A user can manually pivot the air-directing vane via movement of the actuator between the first and second positions. When the actuator is moved to a third position, the reciprocating member operably engages the drive arm and causes the air-directing vane to oscillate automatically.

20 Claims, 9 Drawing Sheets

U.S. PATENT DOCUMENTS

| | | | |
|---|---|---|---|
| 6,129,627 A | 10/2000 | Jankowski et al. | 454/155 |
| 6,159,092 A | 12/2000 | Elder | 454/155 |
| 6,196,914 B1 * | 3/2001 | Lyu | 454/153 |
| 6,386,965 B1 | 5/2002 | Greenwald et al. | 454/75 |
| 6,435,962 B1 | 8/2002 | Herron et al. | 454/290 |

* cited by examiner

AIR DUCT OUTLETS WITH MANUAL AND AUTOMATIC AIR STREAM DIRECTION CONTROL

RELATED APPLICATION

This application claims the benefit of U.S. Provisional Application No. 60/444,335 filed Jan. 31, 2003, the disclosure of which is incorporated herein by reference in its entirety as if set forth fully herein.

FIELD OF THE INVENTION

The present invention relates generally to vehicles and, more particularly, to air duct outlets utilized within vehicles.

BACKGROUND OF THE INVENTION

Conventionally, vehicle interiors are provided with one or more air duct outlets which are connected by ducts to an outside air source and/or to a heating and/or air conditioning system that provides cooled and/or heated air. Because it is generally desirable for vehicle occupants to be able to adjust the direction of air flow within a vehicle interior, air duct outlets are typically provided with adjustable vanes or louvers. In addition, air duct outlets may be provided with dampers for allowing vehicle occupants to control the amount of air flowing therethrough.

Conventional air duct outlets utilize one or more sets of louvers to mechanically redirect air streams. While this technology is proven and successful, the louver assemblies can be complex and expensive to manufacture. In addition, conventional air duct outlets typically provide an air stream deflection range up to only about 90° (i.e., −45° to +45° relative to a centerline of an air duct outlet). Deflection ranges in excess of ±45° typically result in large pressure drops and lower air flow rates, which may be undesirable. In addition, vehicle manufacturers are continuously seeking components, such as air duct outlets, that have enhanced functionality and durability, yet are cost effective to manufacture.

Vehicle customers are also demanding air duct outlets that can provide automatic oscillation of air flow within a vehicle. As such, there is a need for air duct outlets that allow users to manually direct air flow and that also provide automatic oscillation of air flow.

SUMMARY OF THE INVENTION

In view of the above discussion, air duct outlets that provide automatic oscillation of air flow and that also allow users to manually redirect air streams within a wide range of directions are provided. According to embodiments of the present invention, an air duct outlet includes a housing having an air passageway that terminates at an air outlet. A reciprocating member is movably secured to the housing and is configured for reciprocal movement along a longitudinal axis thereof. A drive source is operably connected to the reciprocating member and transmits reciprocating motion to the reciprocating member. An air-directing vane is pivotally attached within the air passageway and is movable within a range of positions to direct an air stream flowing through the air passageway and exiting from the outlet. An actuator extends from the housing and is movable between first, second and third positions. The actuator is operably coupled with a drive arm that is operably coupled with the air-directing vane. A user can manually pivot the air-directing vane within the range of positions via movement of the actuator between the first and second positions. When the actuator is moved to a third position, the reciprocating member operably engages the drive arm and causes the air-directing vane to oscillate automatically within the range of positions.

Air duct outlets according to embodiments of the present invention allow for improved air flow directability including greatly increased ranges of directability. Moreover, air duct outlets according to embodiments of the present invention can facilitate new and improved styling opportunities for vehicle manufacturers and other manufacturers. Air duct outlets according to embodiments of the present invention are not limited to uses within vehicles (e.g., automobiles, trucks, boats, aircraft, etc.), but may also be utilized in residential and commercial heating, ventilating and air conditioning (HVAC) applications.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
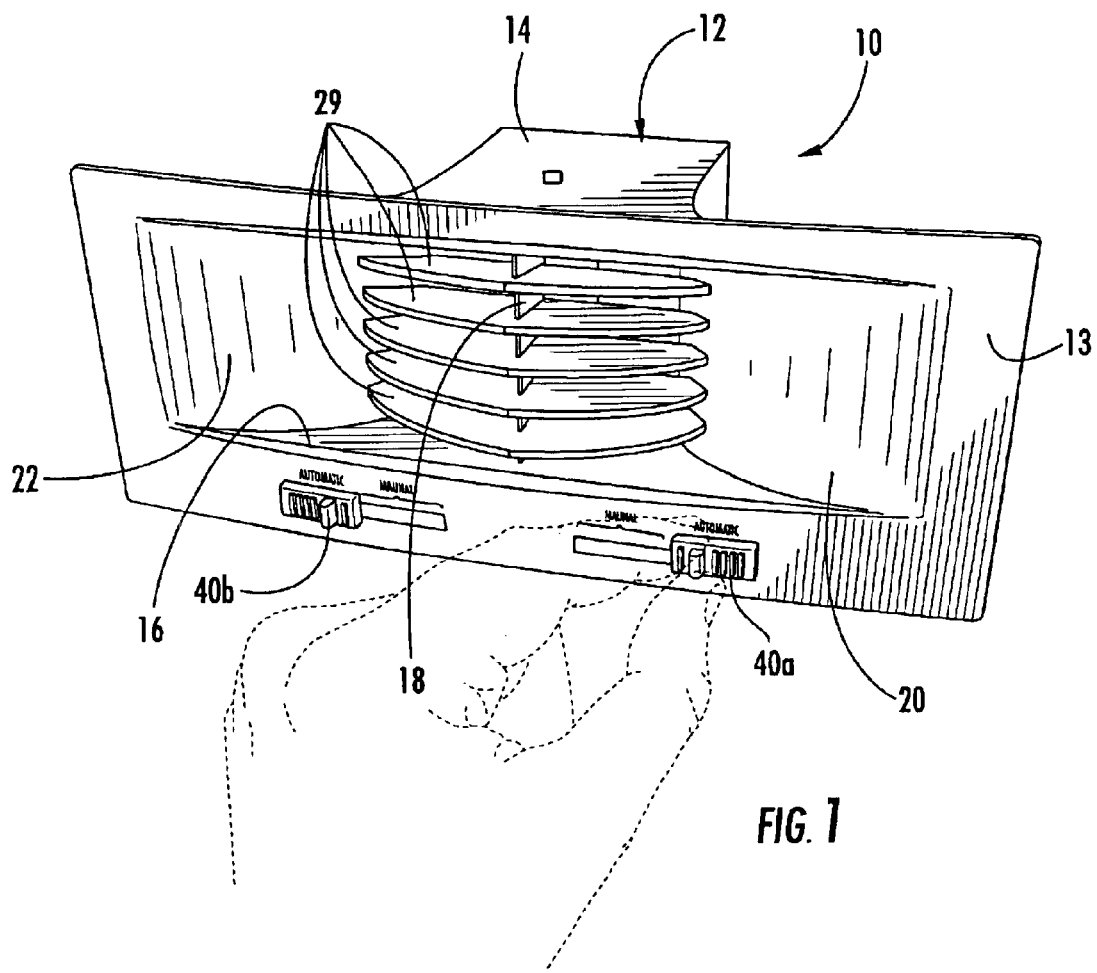
FIG. 1 is a front, perspective view of an air duct outlet, according to embodiments of the present invention.
Figure 2:
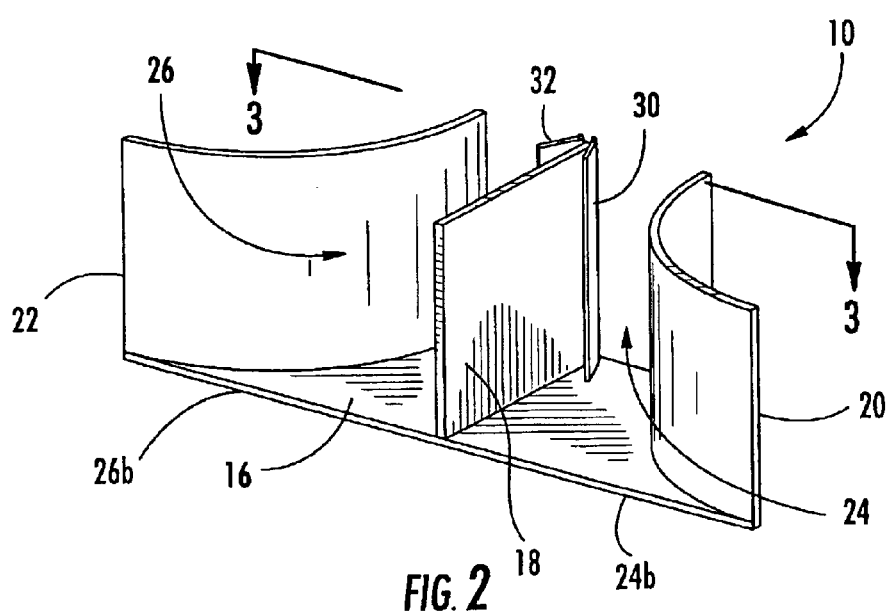
FIG. 2 is a partial perspective view of the air duct outlet of FIG. 1 with the central planar wall and convexly-curved walls illustrated.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upward", "downward", "vertical", "horizontal", and the like, are used herein for the purpose of explanation only.

Referring to FIGS. 1–12, an air duct outlet 10 having manual/automatic air stream direction control, according to embodiments of the present invention, is illustrated. The illustrated air duct outlet 10 is designed for use within the interior compartments of vehicles, such as automobiles, trucks, trains, boats, aircraft, and the like. However, it is understood that the air duct outlet 10 may be utilized in various environments (e.g., in homes and offices) and is not limited only to use in vehicles.

The illustrated air duct outlet 10 includes a housing 12 having a front panel 13, a top wall 14, a bottom wall 16, a central wall 18 and a pair of convexly-curved walls 20, 22, each positioned on respective opposite sides of the central wall 18. The illustrated central wall 18 has a generally planar configuration, but can have various shapes and configurations without limitation. Central wall 18 and convexly-curved wall 20 are in adjacent, spaced-apart relationship and define a first air passageway 24 (FIG. 2) having an inlet 24a and a flared outlet 24b, as illustrated. Similarly, central wall 18 and convexly-curved wall 22 are in adjacent, spaced-apart relationship and define a second air passageway 26 (FIG. 2) having an inlet 26a and a flared outlet 26b, as illustrated. As would be understood by those skilled in the art, the housing 12 is configured to be connected to a source of air flow, such as a fan, that supplies heated and/or cooled air (as well as ambient outside air) to the first and second air passageways 24, 26.

The illustrated air duct outlet 10 includes a plurality of fixed, generally horizontal louvers 29 (FIG. 1) that extend between convexly-curved walls 20, 22. Embodiments of the present invention may have various numbers and configurations of fixed louvers and are not limited to the illustrated louvers 29. Moreover, embodiments of the present invention need not have any fixed louvers.

Figure 3:
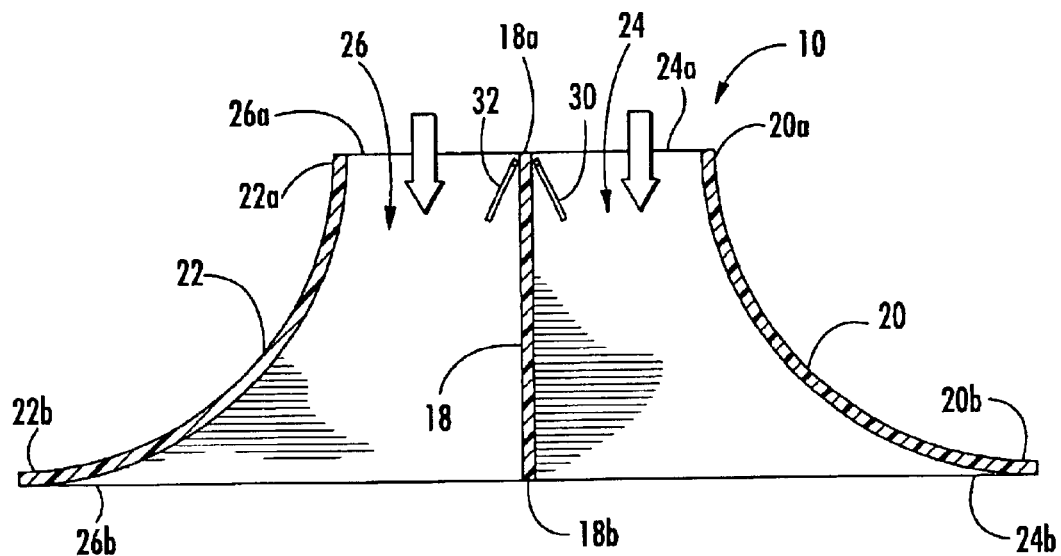
FIG. 3 is a top view of FIG. 2, taken along lines 3—3.

Referring to FIG. 3, respective end portions 18a, 20a of the central wall 18 and convexly-curved wall 20 at the first air passageway inlet 24a are substantially parallel (i.e., they generally extend along directions that are substantially parallel), and respective end portions 18b, 20b of the central wall 18 and convexly-curved wall 20 at the first air passageway outlet 24b are substantially orthogonal (i.e., they generally extend along directions that are substantially perpendicular). Similarly, respective end portions 18a, 22a of the central wall 18 and convexly-curved wall 22 at the second air passageway inlet 26a are substantially parallel, and respective end portions 18b, 22b of the central wall 18 and convexly-curved wall 22 at the second air passageway outlet 26b are substantially orthogonal.

In the illustrated embodiment, a first vane 30 is pivotally attached within the first air passageway 24 adjacent the first air passageway inlet 24a and is movable within a range of positions that are increasingly transverse to the central wall 18. Similarly, a second vane 32 is pivotally attached within the second air passageway 26 adjacent the second air passageway inlet 26a and is movable within a range of positions that are increasingly transverse to the central wall 18. Vanes 30, 32 may be pivotally attached within the respective air passageways 24, 26 in various ways (e.g., via pivot pins, hinges, etc.), without limitation. Vanes 30, 32 may be pivotally attached to the respective central wall 18 and/or to the top and/or bottom walls 14, 16 of the housing, as would be understood by one skilled in the art.

Air duct outlets according to embodiments of the present invention may be formed from various materials, without limitation. For example, the various components of the illustrated air duct outlet 10 may be formed from one or more types of polymeric materials, metals, wood, etc.

Figure 4:
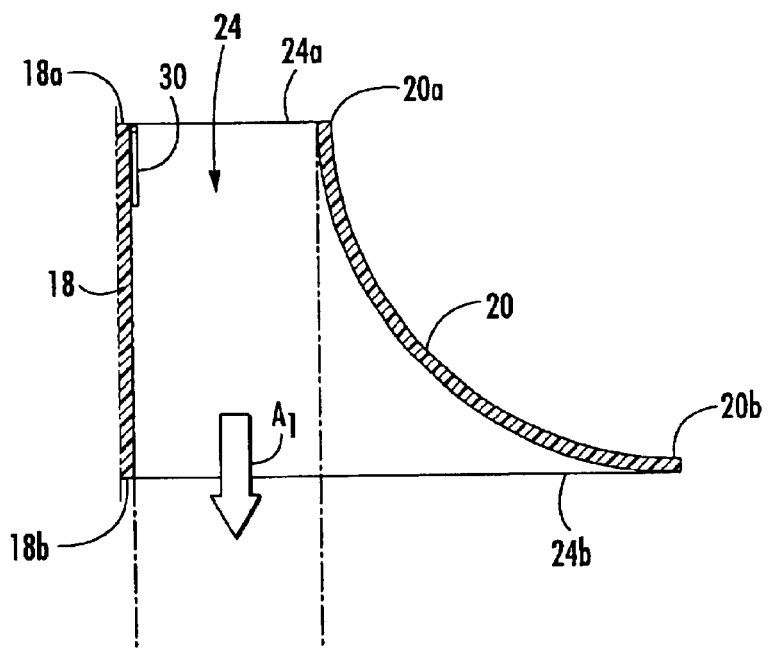
FIGS. 4–6 illustrate movement of the first vane in the first air passageway of the air duct outlet of FIG. 3 and the corresponding changes in air flow direction.
Figure 5:
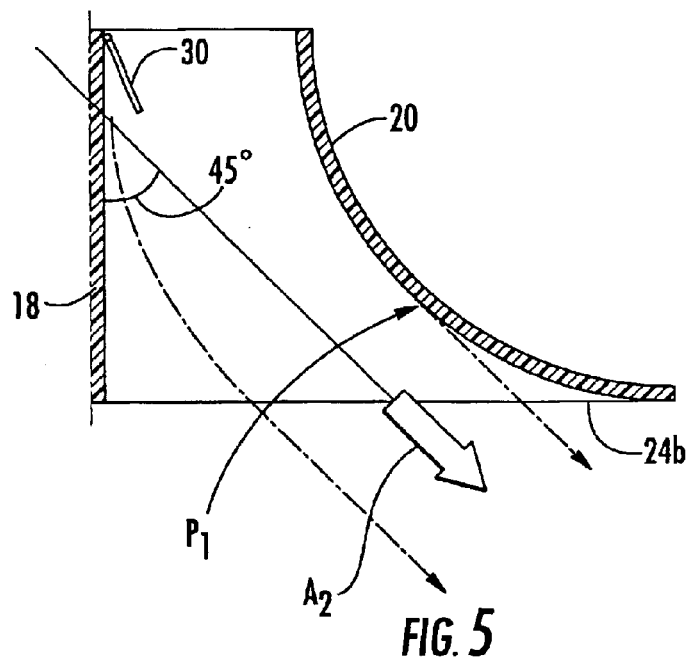
Figure 6:
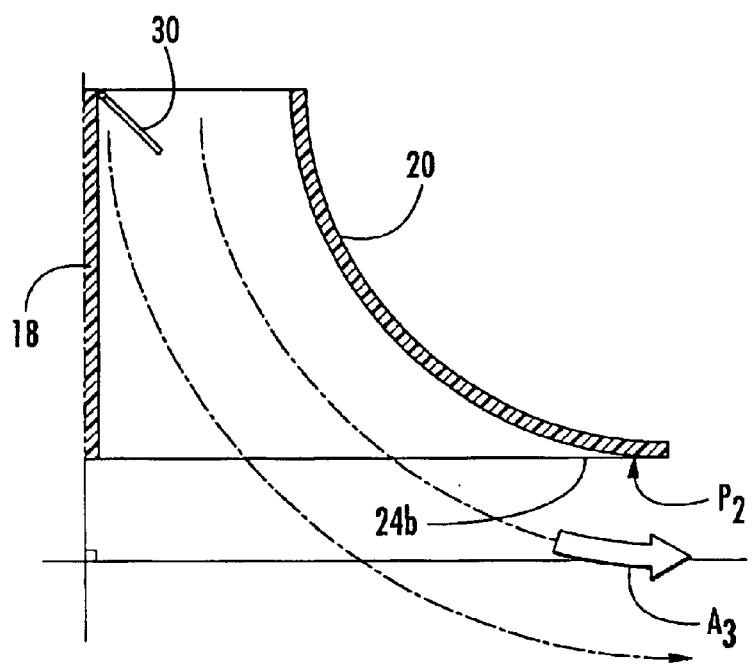
Figure 7:
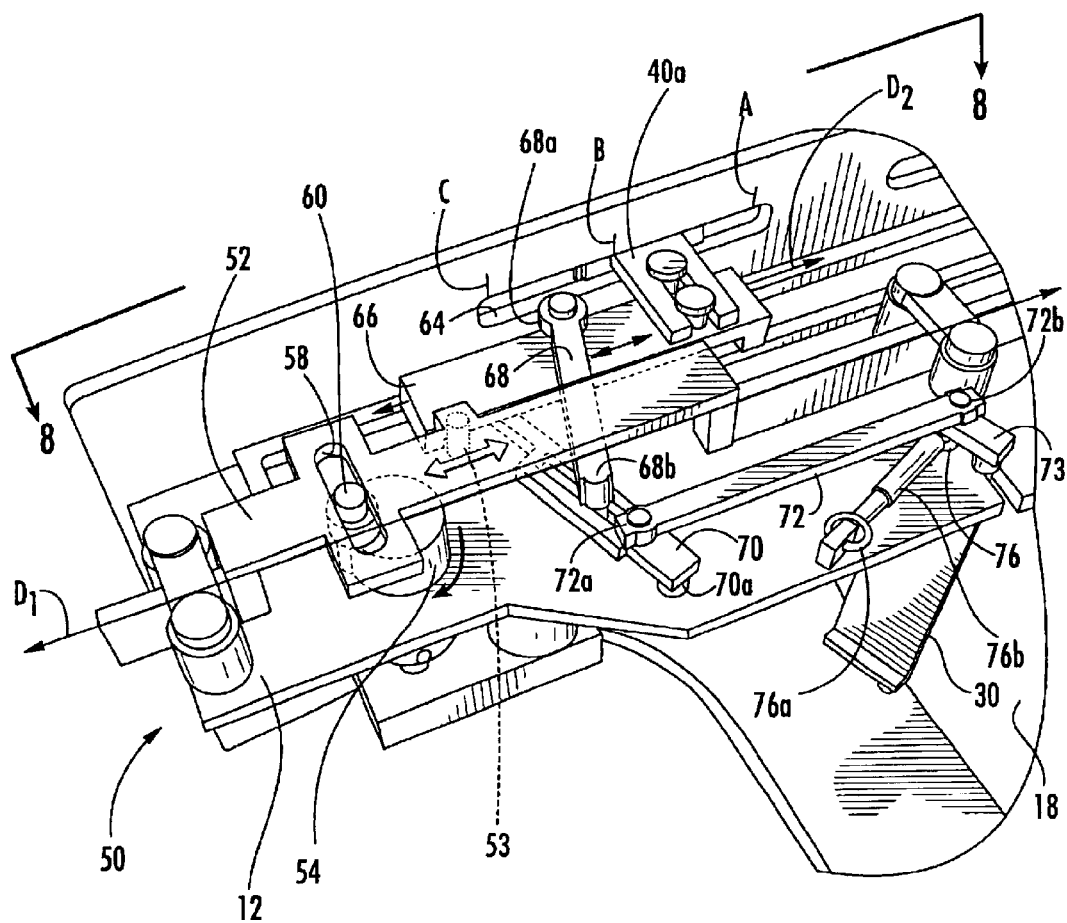
FIG. 7 is a partial perspective view of the air duct outlet of FIG. 1, illustrating the internal manual-automatic assembly that permits manual operation and automatic oscillation of the vane within the first air passageway, according to embodiments of the present invention.

Operation of the first and second vanes 30, 32 to control the direction of air streams exiting from the respective first and second air passageways 24, 26 is identical. Accordingly, operation of only the first vane 30 is illustrated in FIGS. 4–6 and described below.

In a first position (FIG. 4), the first vane 30 is disposed in face-to-face adjacent relationship with the central wall 18. In this position, an air stream flowing through the first air passageway 24 is not deflected by the first vane 30 and the air stream exits from the outlet 24b in a direction $A_1$ that is substantially normal to the first air passageway outlet 24b (i.e., substantially parallel with the illustrated central wall 18). As the first vane 30 is pivoted from the first position (FIG. 4), an air stream flowing through the first air passageway 24 is deflected by an amount that increases with each position of the vane in the range. The air stream adheres to a portion of the convexly-curved wall 20 via a phenomenon known as the "Coanda effect" and by an amount that increases with each amount by which the air stream is deflected.

As known to those skilled in the art, the Coanda effect is the tendency for a moving fluid (either liquid or gas) to attach itself to a surface and flow along the surface. As a fluid moves across a surface a certain amount of friction occurs between the surface and the fluid, which tends to slow down the fluid as it moves across the surface. This resistance to flow tends to pull the fluid towards the surface, making it adhere to the surface, even as it bends around corners.

The more the air stream adheres to the convexly-curved wall 20, the greater the angle the exiting air stream has relative to the central wall 18. For example, in FIG. 5, the first vane 30 is moved partially within its range of movement. At the illustrated position, the air stream adheres to the convexly-curved wall 20 up until location $P_1$ resulting in the air stream exiting from the outlet 24b in a direction $A_2$ that is transverse to the central wall. In the illustrated embodiment, $A_2$ is at an angle of about 45° relative to the central wall 18. In FIG. 6, the first vane 30 is moved further within its range of movement. At the illustrated position, the air stream adheres to the convexly-curved wall 20 up until location $P_2$ resulting in the air stream exiting from the outlet 24b in a direction $A_3$ that is substantially orthogonal (e.g., about 90°) to the central wall 18.

Accordingly, an air stream flowing through the first air passageway 24 exits from the outlet 24b in a direction that is increasingly transverse to a direction normal to the outlet 24b as the first vane 30 is moved along its range of movement. Similarly, an air stream flowing through the second air passageway 26 would exit from the outlet 26b in a direction that is increasingly transverse to a direction normal to the outlet 26b as the second vane 32 is moved along its range of movement.

In the illustrated embodiment, each vane 30, 32 is movable within a range of positions that can cause an air stream to have an exit direction from the first and second air passageway outlets 24b, 26b of between about 0° and about 90° relative to a direction normal to each respective outlet 24b, 26b. Moreover, because there are no movable louvers to reduce the effective areas of the outlets 24b, 26b (as there are with conventional air duct outlets), large pressure drops and lower flow rates are avoided even when an air stream exits at a 90° angle.

Referring back to FIG. 1, a pair of actuators 40a, 40b extend from the housing front panel 13 and are each operably coupled with a respective one of the first and second vanes 30, 32 to allow a user to manually adjust air flow direction and to select automatic oscillation of air flow. A user desiring to manually adjust the direction of an air stream exiting from the first air passageway outlet 24b moves actuator 40a within a range of positions that are between first and second positions (A and B, FIG. 7). Movement of the actuator 40a between the first and second positions causes the first vane 30 to be moved within its range of movement. A user desiring automatic oscillation of an air stream exiting from the first air passageway outlet 24b moves actuator 40a to a third position (C, FIG. 7).

Similarly, a user desiring to manually adjust the direction of an air stream exiting from the second air passageway outlet 26b moves actuator 40b within a range of positions that are between the first and second positions A, B. Movement of the actuator 40b between the first and second positions causes the first vane 32 to be moved within its range of movement. A user desiring automatic oscillation of an air stream exiting from the second air passageway outlet 26b moves actuator 40b to the third position C.

In the illustrated embodiment, the third position (automatic oscillation) is to the right of the first and second positions (manual direction control) for actuator 40a and to the left of the first and second positions for actuator 40b. However, embodiments of the present invention are not limited to any particular arrangement of an actuator with respect to automatic oscillation and manual direction control. Moreover, actuators 40a, 40b may be located virtually anywhere on the front panel 13.

Referring now to FIGS. 7–12, a manual-automatic assembly 50 that connects actuator 40a and air-directing vane 30 and that permits manual operation and automatic oscillation, according to embodiments of the present invention, is illustrated. The illustrated assembly 50 includes an elongated reciprocating member 52 that is movably secured to the housing 12. The reciprocating member 52 is configured for reciprocal movement along a longitudinal axis, indicated by $D_1$. A pin 53 extends downwardly from the reciprocating member 52, as illustrated.

A drive source 54 is operably connected to the reciprocating member 52 and transmits reciprocating motion to the reciprocating member 52. The illustrated drive source 54 may include an electrical motor that provides rotational motion via a drive shaft, as would be understood by those skilled in the art. A pin 60 is secured to a peripheral region of the drive source and engages a slot 58 in the reciprocating member 58, as illustrated.

Electrical motors and drive shafts extending therefrom are well understood by those skilled in the art and need not be described further herein. Various types and sizes of electrical motors may be utilized in accordance with embodiments of the present invention. Power for an electrical motor may be provided via various sources. For example, power may be provided from one or more batteries or from the electrical system of a vehicle. Ways of providing power to an electrical motor are within the scope of knowledge of those skilled in the art and need not be described further herein.

A slot 58 formed in a portion of the reciprocating member 52 receives the pin 60 and serves as a linkage to operably connect the rotating drive source 54 to the reciprocating member 52. The rotational motion of the pin is converted into reciprocating motion of the reciprocating member 52. The reciprocating member 52 may reciprocate continuously whether the actuator 40a is in position C (automatic oscillation) or between positions A and B (manual operation). Alternatively, the drive source 54 may only rotate when the actuator 40a is moved to position C, such that the reciprocating member 52 only reciprocates when the actuator 40a is moved to position C.

The actuator 40a, which extends through the housing 12 via slot 64 is connected to slide member 66, as illustrated. Actuator 40a and slide member 66 are slidably movable along a longitudinal axis indicated as $D_2$ between first, second and third positions, indicated by A, B, C, respectively. An elongated drive arm 68 is pivotally connected to the slide member 66 at a first end 68a and slidably engages a first linkage member 70 at a second end 68b. The illustrated first linkage member 70 is pivotally connected to the housing 12. A second linkage member 72 has an elongated configuration with opposite ends 72a, 72b. End 72a has a pinned connection with the first linkage member 70 and opposite end 72b has a pinned connected with a third linkage member 73. The third linkage member 73 is connected to the air-directing vane 30. A biasing member 76 is secured at a first end 76a to the housing 12 and to the third linkage member 73 at an opposite second end 76b. Biasing member 76 is configured to continuously urge the vane 30 to a substantially transverse direction relative to central wall 18. Biasing member 76 may be virtually any type of spring or elastic member.

Figure 8:
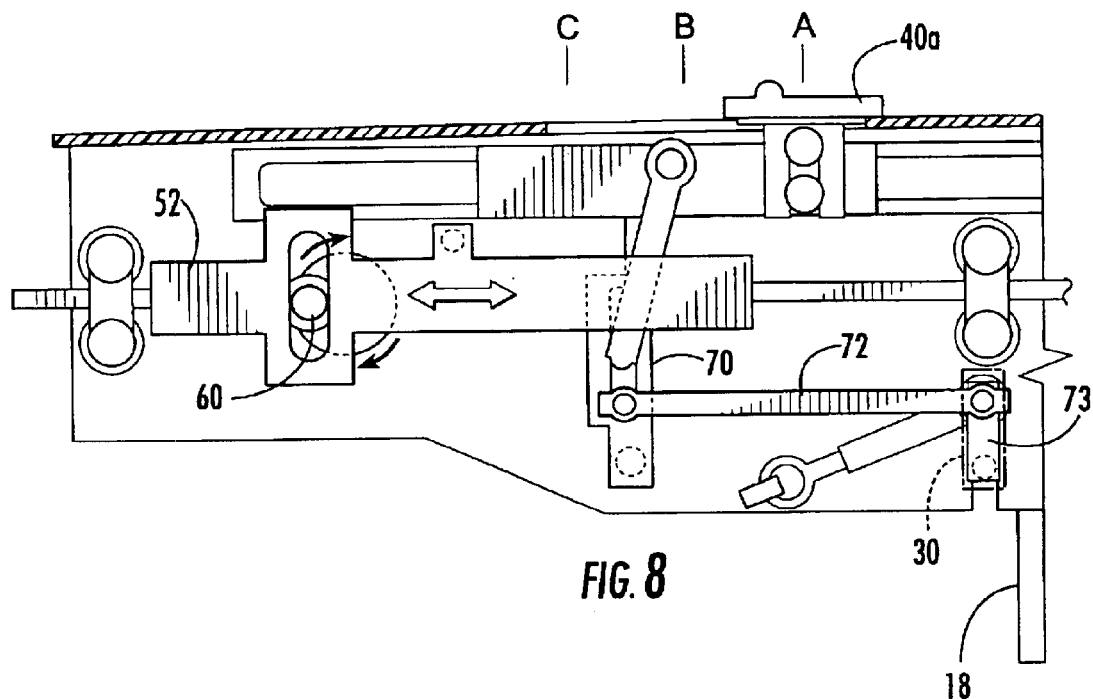
FIG. 8 is a top section view of the air duct outlet of FIG. 7, taken along lines 8—8 and illustrating the actuator in the first position (manual direction control).

Manual control of the air-directing vane 30 is performed when the actuator 40a is moved between first and second positions A, B. In FIG. 8, the actuator 40a is in the first position A which causes the air-directing vane 30 to be disposed in face-to-face adjacent relationship (FIG. 4) with the central wall 18. In this position, an air stream flowing through the first air passageway 24 is not deflected by the first vane 30 and the air stream exits from the outlet 24b in a direction A1 that is substantially normal to the first air passageway outlet 24b (i.e., substantially parallel with the illustrated central wall 18).

Figure 9:
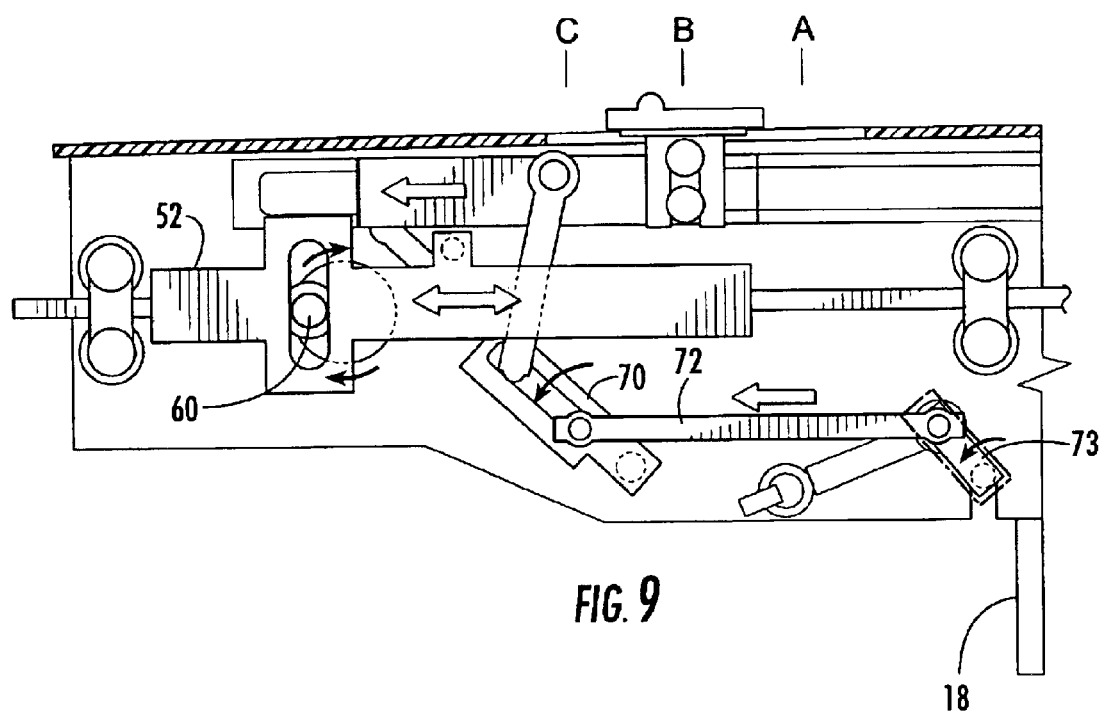
FIG. 9 illustrates the air duct outlet of FIG. 8 with the actuator in the second position (manual direction control).

In FIG. 9, the actuator 40a is in the second position B which causes the air-directing vane 30 to be in its transverse-most position relative to the central wall 18 (FIG. 6) such that the air stream exits from the outlet 24b in a direction $A_3$ that is substantially orthogonal (e.g., about 90°) to the central wall 18. User movement of actuator 40a between the first and second positions A, B allows a user to manually control the direction of air flow exiting from the outlet 24b. Accordingly, positions A, B represent endpoints of the range of manual movement of the air-directing vane 30.

Figure 10:
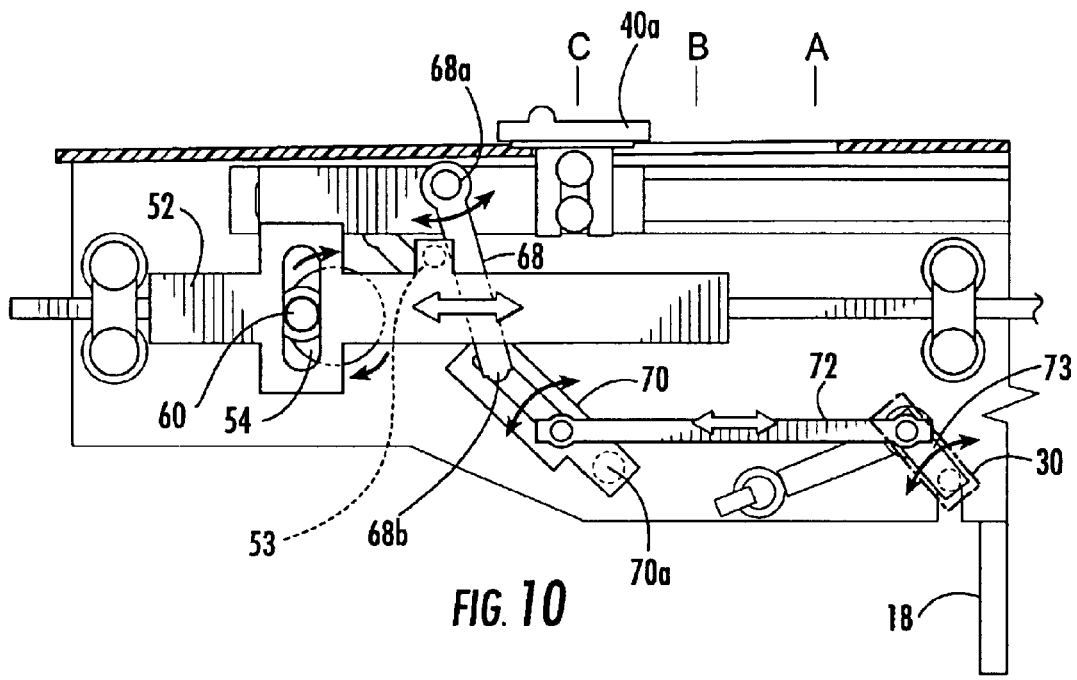
FIGS. 10–12 illustrates the air duct outlet of FIG. 8 with the actuator in the third position (automatic oscillation).
Figure 11:
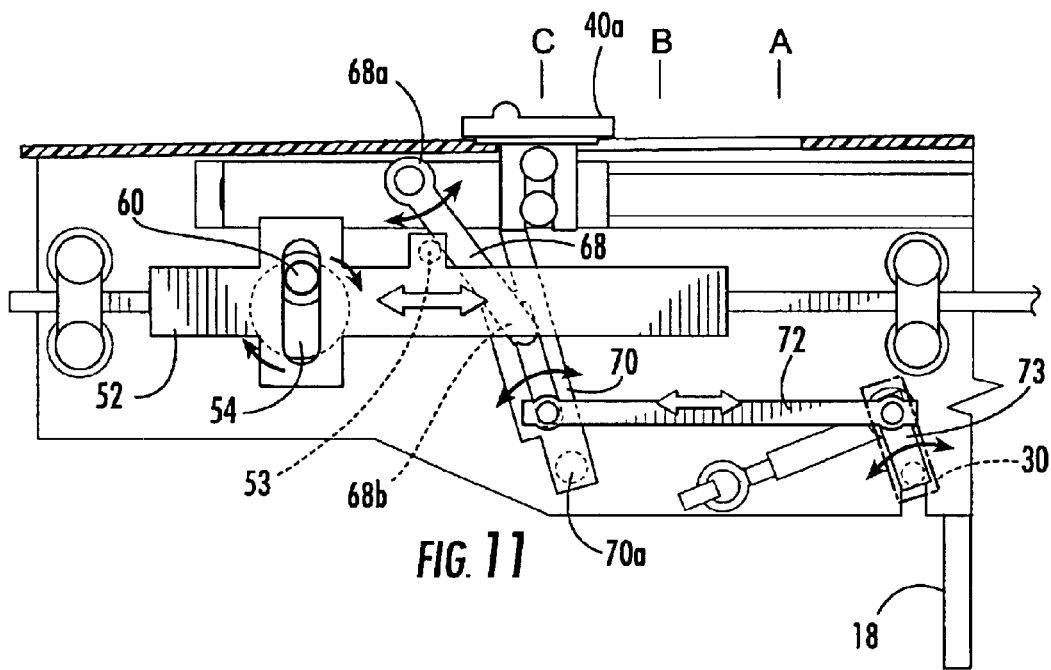
Figure 12:
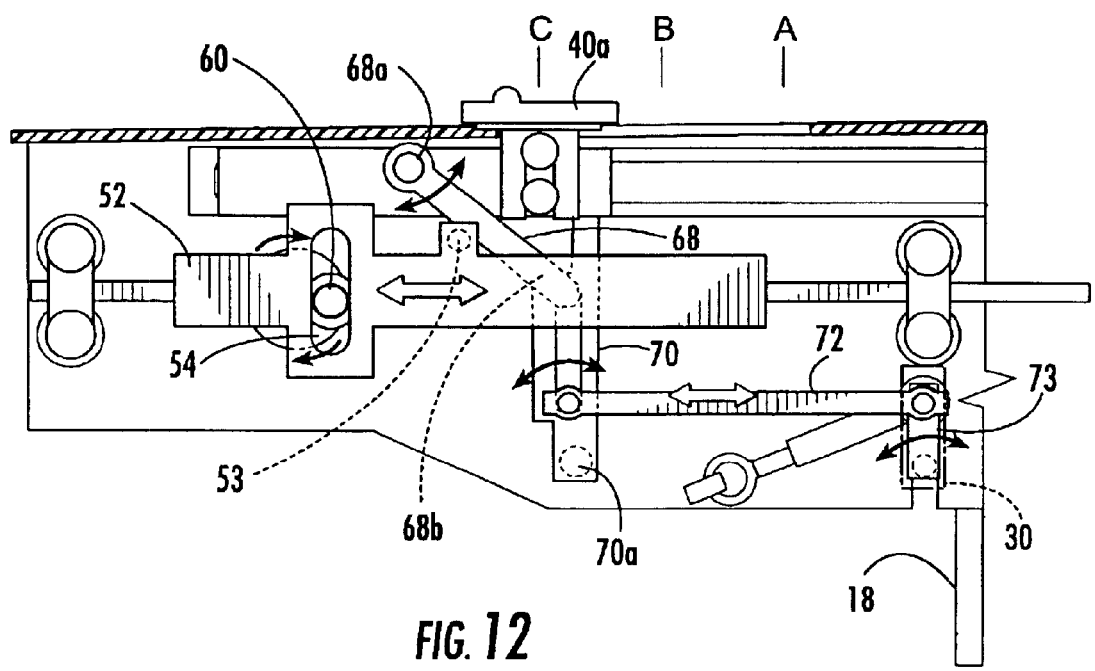

Automatic oscillation of the air-directing vane 30 is initiated when the actuator 40a is moved to its third position C (FIGS. 10–12). When the actuator 40a is moved to the third position C, the drive arm 68 is moved into position such that the reciprocating member pin 53 makes contact with the drive arm 68. The reciprocating motion of the reciprocating member 52 is transmitted to the drive arm 68 which pivots about end 68a. This pivotal movement causes the first linkage 70 to pivot about end 70a and thereby move the second and third linkages 72, 73, thereby moving the air-directing vane 30.

Biasing member 76 provides a constant pull on the third linkage 73 such that the vane 30 is constantly being pulled to the most transverse position. In conjunction with the reciprocating pin 53 engaging the first linkage member 70, the biasing member 76 causes the vane 30 to reciprocate between the position illustrated in FIG. 4 and the position illustrated in FIG. 6. When actuator 40a is in the second position B, drive arm 68 is sufficiently to the right of reciprocating pin 53 such that reciprocating pin 53 cannot engage drive arm 68.

FIGS. 10–12 illustrate a portion of a cycle of automatic oscillation of air-directing vane 30. In FIG. 10, pin 60 is at a "9 o'clock" position which causes the air-directing vane 30 to be in its most transverse orientation relative to the central wall 18. In FIG. 11 the drive shaft has rotated the pin 60 to the "12 o'clock" position and the air-directing vane 30 is moved to a less transverse orientation relative to the central wall 18. In FIG. 12, the drive shaft has rotated the pin 60 to the "3 o'clock" position and the air-directing vane 30 is moved to face-to-face orientation with the central wall 18.

Various ways of mechanically linking each actuator 40a, 40b with a respective vane 30, 32 may be utilized. Embodiments of the present invention are not limited to the illustrated assembly 50 and the various linkages and configurations thereof.

Figure 13:
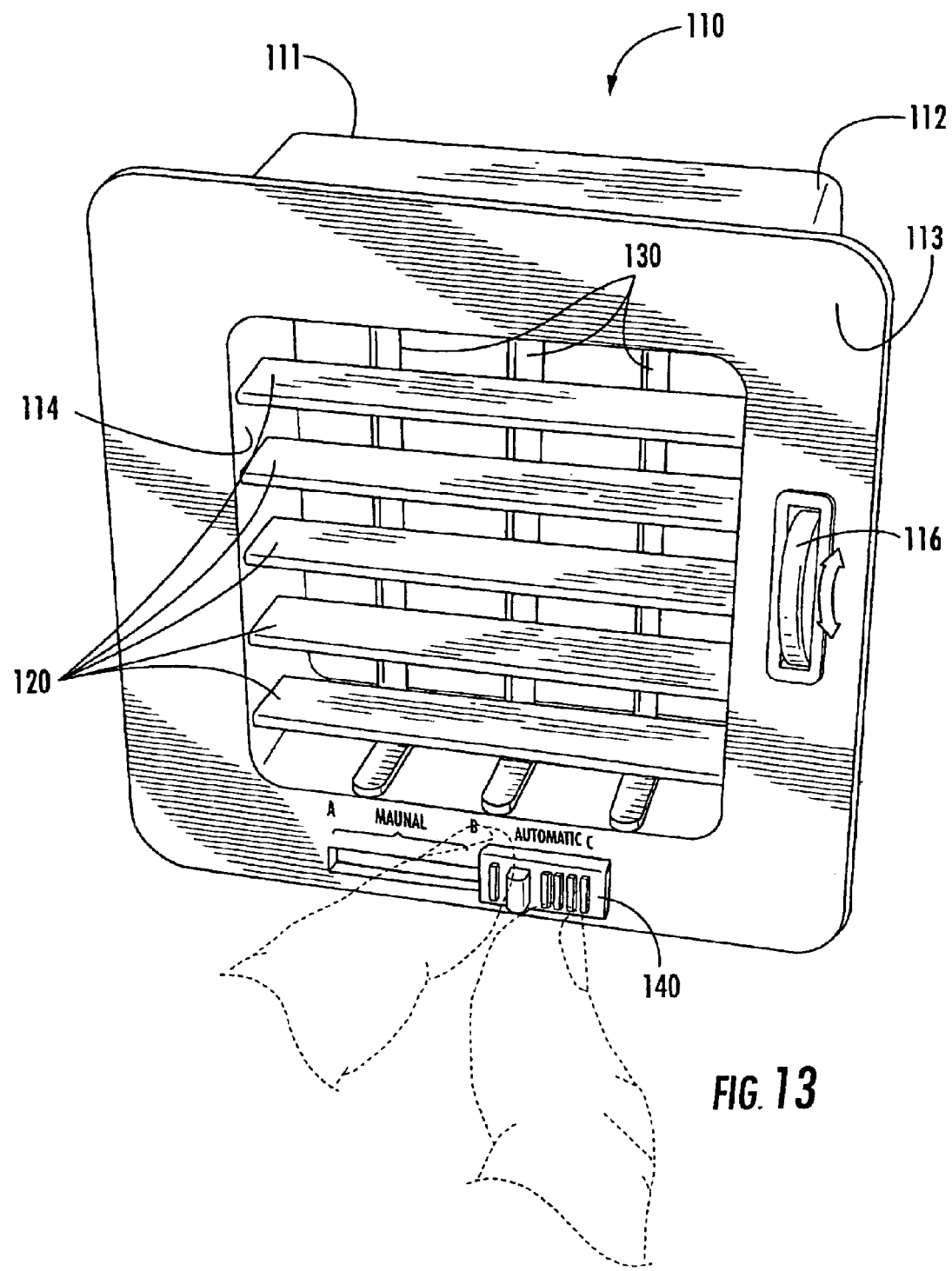
FIG. 13 is a front, perspective view of an air duct outlet, according to another embodiment of the present invention.
Figure 14:
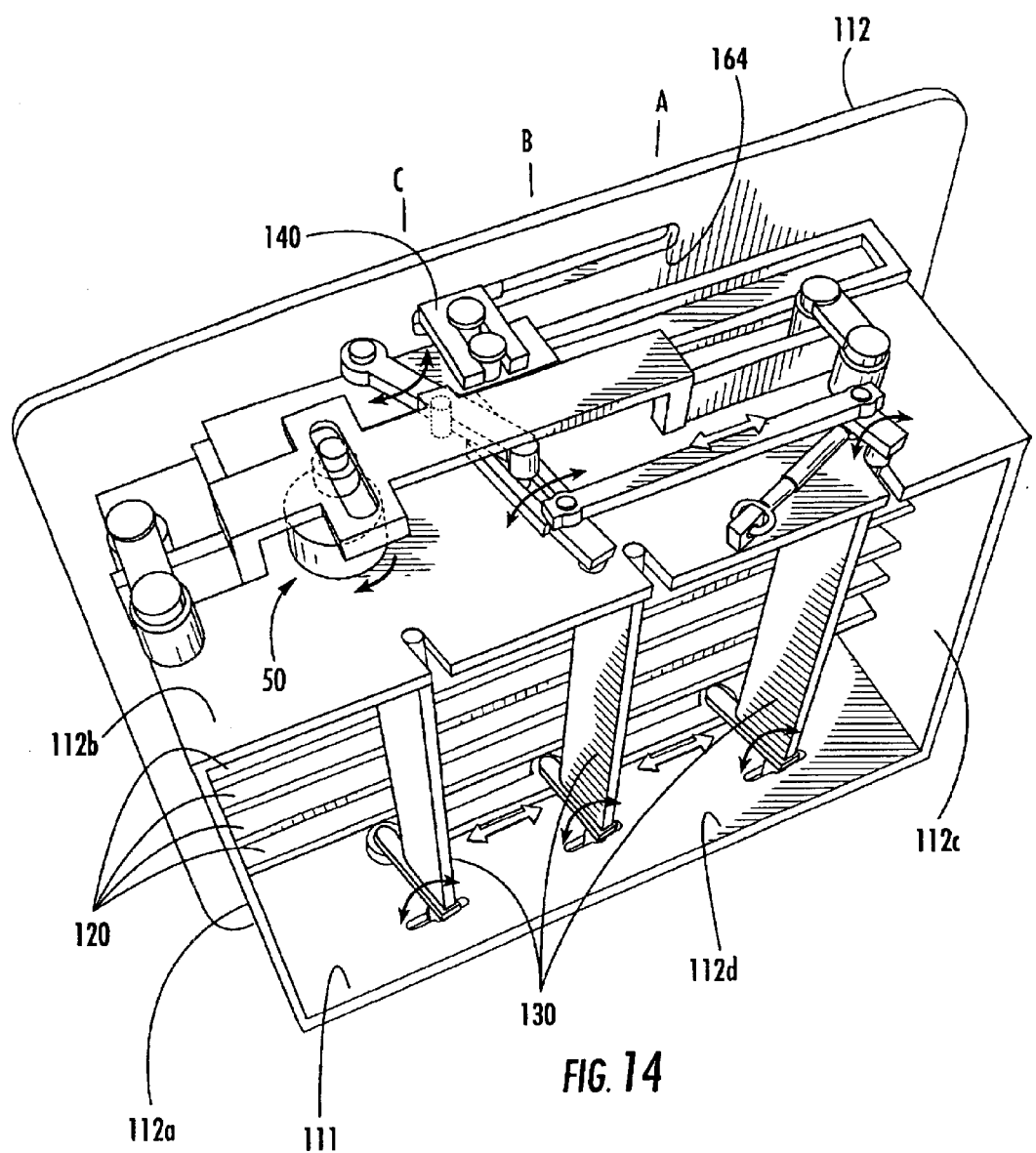
FIG. 14 is a rear perspective view of the air duct outlet of FIG. 13 illustrating the internal manual-automatic assembly that permits manual operation and automatic oscillation of a set of louvers.

Referring now to FIGS. 13–14, an air duct outlet 110, according to other embodiments of the present invention, is illustrated. The illustrated air duct outlet 110 includes a housing 112. The housing 112 includes a front wall 113 having an opening 114 therein that allows air to pass therethrough. A thumbwheel 116 extends through the front wall 114, as illustrated, and is utilized to adjust air flow in an up and down direction as described below. As would be understood by those skilled in the art, the air duct outlet 110 is connected to a source of air flow, such as a fan, to supply heated and/or cooled air (as well as ambient outside air) to an interior compartment of a vehicle. Air is supplied into the rear of the housing 112 through an opening 111 formed by the housing walls 112a–112d and exits through the first opening 114 in the front of the housing 112.

The illustrated air duct outlet 110 includes a first set of elongated, horizontal louvers 120 that are in generally parallel, spaced-apart relationship with each other. The first set of louvers 120 are pivotally mounted within the air duct outlet 110 and pivotal movement thereof is controlled by thumbwheel 116, as would be understood by those skilled in the art. A second set of elongated louvers 130 are in generally parallel, spaced-apart relationship with each other. The second set of louvers 130 are pivotally mounted within the air duct outlet and pivotal movement thereof is controlled by the manual-automatic air stream direction control assembly 50, described above with respect to FIGS. 1–12. The assembly 50, is connected to a single one of the vertical louvers 130. Because the vertical louvers 130 are pivotally connected together, movement of one louver causes all to move, as would be understood by those skilled in the art.

Manual control of the air-directing louvers 130 occurs when the actuator 140 is moved between first and second positions A, B., as described above. Automatic oscillation of the louvers 130 occurs when the actuator is moved to position C.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An air duct outlet, comprising:

a housing comprising an air passageway that terminates at an air outlet;

a reciprocating member movably secured to the housing and configured for reciprocal movement along a longitudinal axis thereof;

a drive source operably connected to the reciprocating member and that transmits reciprocating motion to the reciprocating member;

at least one air-directing vane pivotally attached within the air passageway and movable within a range of positions to direct an air stream flowing through the air passageway and exiting from the outlet; and an actuator extending from the housing and movable between first and second positions, wherein the actuator is operably coupled with a drive arm that is operably coupled with the at least one air-directing vane to allow a user to manually pivot the at least one air-directing vane within the range of positions via movement of the actuator between the first and second positions, and wherein the actuator is movable to a third position wherein the reciprocating member operably engages the drive arm and causes the at least one air-directing vane to oscillate automatically within the range of positions.

2. The air duct outlet of claim 1, wherein the drive source comprises:

an electrical motor attached to the housing that comprises a rotating drive shaft; and a linkage operably connected to the rotating drive shaft and to the reciprocating member, wherein the linkage converts rotational motion of the drive shaft into reciprocating motion and transmits the reciprocating motion to the reciprocating member.

3. The air duct outlet of claim 1, wherein the at least one air-directing vane comprises a plurality of air-directing vanes pivotally secured within the housing in spaced-apart adjacent relationship, each air-directing vane being pivotally secured about one of a plurality of substantially parallel axes, wherein the air-directing vanes are operably connected together such that pivotal movement of any one of the air-directing vanes causes pivotal movement of the remaining air-directing vanes.

4. The air duct outlet of claim 1, wherein the actuator comprises a thumbwheel extending from the housing.

5. The air duct outlet of claim 1, wherein the actuator comprises a sliding member extending from the housing.

6. The air duct outlet of claim 1, wherein the drive source transmits reciprocating motion continuously to the reciprocating member.

7. An air duct outlet, comprising:

a housing comprising a planar first wall and a convexly-curved second wall that are in adjacent, spaced-apart relationship and that define an air passageway having an inlet and a flared outlet;

a reciprocating member movably secured to the housing and configured for reciprocal movement along a longitudinal axis thereof;

a drive source operably connected to the reciprocating member and that transmits reciprocating motion to the reciprocating member;

an air-directing vane pivotally attached within the air passageway and movable within a range of positions that are increasingly transverse to the first wall, wherein an air stream flowing through the air passageway is deflected by an amount that increases with each position of the air-directing vane in the range such that the air stream adheres to a portion of the second wall by an amount that increases with each position of the air-directing vane in the range and such that the air stream exits from the outlet in a direction that is increasingly transverse to a direction normal to the outlet; and an actuator extending from the housing and movable between first and second positions, wherein the actuator is operably coupled to a drive arm that is operably coupled with the air-directing vane to allow a user to manually pivot the air-directing vane within the range of positions via movement of the actuator between the first and second positions, and wherein the actuator is movable to a third position wherein the reciprocating member engages the drive arm and causes the air-directing vane to oscillate automatically within the range of positions.

8. The air duct outlet of claim 7, wherein the drive source comprises:

an electrical motor attached to the housing that comprises a rotating drive shaft; and a linkage operably connected to the rotating drive shaft and to the reciprocating member, wherein the linkage converts rotational motion of the drive shaft into reciprocating motion and transmits the reciprocating motion to the reciprocating member.

9. The air duct outlet of claim 7, wherein respective end portions of the first and second walls at the air passageway inlet are substantially parallel.

10. The air duct outlet of claim 7, wherein respective end portions of the first and second walls at the air passageway outlet are substantially orthogonal.

11. The air duct outlet of claim 7, wherein movement of the air-directing vane between endpoints of the range causes a change in direction of an air stream exiting the outlet of between about 0° and about 90° relative to a direction normal to the outlet.

12. The air duct outlet of claim 7, wherein the air-directing vane is pivotally attached within the passageway adjacent the inlet.

13. An air duct outlet, comprising:

a housing comprising a pair of adjacent air passageways that each terminate at a respective air outlet;

a reciprocating member movably secured to the housing and configured for reciprocal movement along a longitudinal axis thereof;

a drive source operably connected to the reciprocating member and that transmits reciprocating motion to the reciprocating member;

an air-directing vane pivotally attached within each of the air passageways, wherein each air-directing vane is movable within a range of positions to direct an air stream exiting from the respective air passageway outlet; and a pair of actuators extending from the housing, wherein each actuator is movable between first and second positions, wherein each actuator is operably coupled to a respective a drive arm that is operably coupled with a respective air-directing vane to allow a user to manually pivot the air-directing vane within the range of positions via movement of the actuator between the first and second positions, and wherein each actuator is movable to a third position wherein the reciprocating member engages a respective drive arm and causes a respective air-directing vane to oscillate automatically within the range of positions.

14. The air duct outlet of claim 13, wherein the drive source comprises:

an electrical motor attached to the housing that comprises a rotating drive shaft; and a linkage operably connected to the rotating drive shaft and to the reciprocating member, wherein the linkage converts rotational motion of the drive shaft into reciprocating motion and transmits the reciprocating motion to the reciprocating member.

15. The air duct outlet of claim 13, wherein each air-directing vane comprises a plurality of air-directing vanes pivotally secured within a respective air passageway in spaced-apart adjacent relationship, each air-directing vane being pivotally secured about one of a plurality of substantially parallel axes, wherein the air-directing vanes are operably connected together such that pivotal movement of any one of the air-directing vanes causes pivotal movement of the remaining air-directing vanes.

16. The air duct outlet of claim 13, wherein each actuator comprises a thumbwheel extending from the housing.

17. The air duct outlet of claim 13, wherein each actuator comprises a sliding member extending from the housing.

18. The air duct outlet of claim 13 wherein each air passageway comprises a planar wall and a convexly-curved wall in adjacent, spaced-apart relationship, and wherein each respective vane is movable within a range of positions that are increasingly transverse to a respective planar wall, wherein an air stream flowing through each air passageway is deflected by an amount that increases with each position of a respective vane in the range such that the air stream adheres to a portion of a respective convexly-curved wall by an amount that increases with each position of the vane in the range and such that the air stream exits from a respective outlet in a direction that is increasingly transverse to a direction normal to the outlet.

19. The air duct outlet of claim 18, wherein movement of each respective vane between endpoints of the range causes a change in direction of an air stream exiting a respective outlet of between about 0° and about 90° relative to a direction normal to the outlet.

20. The air duct outlet of claim 18, wherein each vane is pivotally attached within a respective passageway adjacent the inlet.

* * * * *